United States Patent
Herzog

(10) Patent No.: US 9,729,598 B2
(45) Date of Patent: Aug. 8, 2017

(54) METHOD AND A DEVICE FOR SIGNALLING TRANSMISSION TIME AND/OR A SYSTEM CLOCK

(71) Applicant: Rohde & Schwarz GmbH & Co. KG, Munich (DE)

(72) Inventor: Norman Herzog, Berlin (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 379 days.

(21) Appl. No.: 14/363,464

(22) PCT Filed: Dec. 6, 2012

(86) PCT No.: PCT/EP2012/074587
§ 371 (c)(1),
(2) Date: Jun. 6, 2014

(87) PCT Pub. No.: WO2013/083668
PCT Pub. Date: Jun. 13, 2013

(65) Prior Publication Data
US 2014/0362873 A1    Dec. 11, 2014

(30) Foreign Application Priority Data

Dec. 6, 2011  (DE) .................. 10 2011 087 779
Apr. 26, 2012  (DE) .................. 10 2012 206 910

(51) Int. Cl.
H04L 29/06    (2006.01)
H04N 21/236   (2011.01)
(Continued)

(52) U.S. Cl.
CPC .......... *H04L 65/602* (2013.01); *H04J 3/0664* (2013.01); *H04L 65/608* (2013.01);
(Continued)

(58) Field of Classification Search
CPC ........ H04J 3/067; H04J 3/0632; H04J 3/0664; H04J 3/0685; H04L 29/06027;
(Continued)

(56) References Cited

U.S. PATENT DOCUMENTS 5,566,174 A    10/1996  Sato et al.
2002/0003799 A1  1/2002  Tomita
(Continued)

FOREIGN PATENT DOCUMENTS

DE  102009057362 A1   4/2011
WO    2006075007 A1   7/2006
(Continued)

OTHER PUBLICATIONS

International Preliminary Report on Patentability for International Application No. PCT/EP2012/074587, mailed Jun. 19, 2014, 1 page.
(Continued)

*Primary Examiner* — John Pezzlo
*Assistant Examiner* — Dharmesh Patel
(74) *Attorney, Agent, or Firm* — Ditthavong & Steiner, P.C.

(57) ABSTRACT

A method for signaling a time and/or clock through a header station generating a transport datastream from video and/or audio data to at least one receiver of the transport datastream calculates the time information ($PCR_{N+1}$; $RTP_{N+1}$; $T_{N+1}$) integrated in a transport data packet of the transport datastream iteratively from the time information ($PCR_N$; $RTP_N$; $T_1$) of the transport data packet last transmitted in the transport datastream with integrated time information, from a transmission time of data bits transmitted since the last transmitted transport data packet with integrated time information in the transport datastream and from a clock ($f_{PCR}$; $f_{Sys}$). The time information ($PCR_{N+1}$, $PCR_N$; $RTP_{N+1}$, $RTP_N$;
(Continued)

$T_{N+1}$, $T_1$) serves in each case for the signaling of times or a clock, and, in each case, contains a pulse number counted up to the transmission time of the respective transport data packet of the clock ($f_{PCR}$; $f_{Sys}$).

37 Claims, 7 Drawing Sheets

(51) Int. Cl.
 *H04N 21/242* (2011.01)
 *H04N 21/6437* (2011.01)
 *H04J 3/06* (2006.01)
 *H04N 5/067* (2006.01)

(52) U.S. Cl.
 CPC ....... *H04N 5/067* (2013.01); *H04N 21/23608* (2013.01); *H04N 21/242* (2013.01); *H04N 21/6437* (2013.01); *H04J 3/067* (2013.01)

(58) Field of Classification Search
 CPC ... H04L 65/602; H04L 65/607; H04L 65/608; H04N 5/067; H04N 5/242; H04N 21/631; H04N 21/816; H04N 21/2381; H04N 21/4135; H04N 21/4305; H04N 21/4344; H04N 21/4363; H04N 21/4381; H04N 21/4621; H04N 21/6405; H04N 21/6408; H04N 21/6437; H04N 21/8451; H04N 21/23608; H04N 21/44004; H04N 21/64322; H04N 21/234327
 See application file for complete search history.

(56) References Cited

U.S. PATENT DOCUMENTS

| | | | |
|---|---|---|---|
| 2003/0203729 A1* | 10/2003 | Hansen | H04L 27/16 455/318 |
| 2005/0036521 A1 | 2/2005 | Kim et al. | |
| 2005/0201399 A1 | 9/2005 | Woodward, Jr. et al. | |
| 2006/0088023 A1 | 4/2006 | Muller | |
| 2008/0225943 A1* | 9/2008 | Boice | H04N 19/172 375/240.02 |
| 2010/0008385 A1 | 1/2010 | Noronha, Jr. | |
| 2010/0146554 A1* | 6/2010 | Gordon | H04N 5/4401 725/54 |
| 2010/0254408 A1* | 10/2010 | Kuno | H04N 21/23406 370/474 |
| 2011/0255689 A1* | 10/2011 | Bolotov | H04L 9/0631 380/42 |

FOREIGN PATENT DOCUMENTS

| | | |
|---|---|---|
| WO | 2008151989 A2 | 12/2008 |
| WO | 2010070054 A1 | 6/2010 |
| WO | 2010099188 A1 | 9/2010 |
| WO | WO 2010099188 A1 * | 9/2010 ....... H04N 21/23608 |

OTHER PUBLICATIONS

Notification of Transmittal of Translation of the International Preliminary Report on Patentability (Chapter I or Chapter II) along with Written Opinion of the International Searching Authority for International Application No. PCT/EP2012/074587, mailed Jun. 19, 2014, 9 pages.

International Search Report for corresponding International Application No. PCT/EP2012/074587 dated Feb. 28, 2013, 6 pages.

* cited by examiner

| REST | TS Packet 1 | TS Packet 2 | TS Packet 3 | TS Packet 4 | TS Packet 5 | TS Packet 6 | TS Packet 7 |
|---|---|---|---|---|---|---|---|
| 1 | 0 | 0 | 0 | 1 | 0 | 0 | 0 |
| 2 | 0 | 1 | 0 | 0 | 0 | 1 | 0 |
| 3 | 0 | 1 | 0 | 1 | 0 | 1 | 0 |
| 4 | 1 | 0 | 1 | 0 | 1 | 0 | 1 |
| 5 | 1 | 0 | 1 | 1 | 1 | 0 | 1 |
| 6 | 1 | 1 | 1 | 0 | 1 | 1 | 1 |

| Data rate [Mbit/s] | RTP-packets per second | RTP-packet interval | RTP-packet in buffer |
|---|---|---|---|
| 200 | 18997 | 0,053 | 1899,7 |
| 80 | 7599 | 0,132 | 759,9 |
| 40 | 3799 | 0,263 | 379,9 |
| 30 | 2850 | 0,351 | 285,0 |
| 20 | 1900 | 0,526 | 190,0 |
| 10 | 950 | 1,053 | 95,0 |
| 1 | 95 | 10,528 | 9,5 |

RTP-data packet header:

RTP-data packet header extension

RTP-data packet header extension with time information for individual transport data packets

METHOD AND A DEVICE FOR SIGNALLING TRANSMISSION TIME AND/OR A SYSTEM CLOCK

CROSS-REFERENCE TO RELATED APPLICATION

The present application is a national phase application of PCT Application No. PCT/EP2012/074587, filed Dec. 6, 2012, and claims priority to German Application No. DE 10 2011 087 779.7, filed on Dec. 6, 2011, and German Application No. DE 10 2012 206 910.0, filed on Apr. 26, 2012, the entire contents of which are herein incorporated by reference.

BACKGROUND OF THE INVENTION

Field of the Invention

The invention relates to a method and a device for signaling a transmission time and/or a system clock, especially in a digital television transmission system.

Discussion of the Background

In a digital television transmission system, for example, according to the US-American Advanced-Television-Systems-Committee (ATSC) standard or according to the Digital-Video-Broadcast (DVB) standard conventional in Europe, time information is transmitted between a header station associated with the broadcaster and the individual television receivers, in each case in order to reconstruct respectively synchronize the system clock used by the broadcaster and to determine the display time based upon this system clock of every individual image of the television transmission on the screen of the television receiver.

In the case of the Moving-Picture-Expert-Group (MPEG) coding—Moving Picture Expert Group coding—conventionally used in television transmission, the system clock used by the broadcaster is transmitted in the Program-Clock-Reference (PCR) field—Program Clock Reference Field— of an MPEG-coded transport data packet of the display time of an image on the screen of the television receiver in the Presentation-Time-Stamp (PTS) field (Presentation Time Stamp Field) of an MPEG-coded transport data packet, and the time of the decoding of an image in the television receiver is transmitted in the Decoding-Time-Stamp (DTS) field (Decoding Time Stamp field) of an MPEG-coded transport data packet from the header station of the broadcaster to the television receiver.

Additionally, the transmission times of the individual MPEG-coded transport data packets of the transport datastream transmitted from the header station to the individual television receivers are transmitted between the header station of the broadcaster and an output adapter disposed downstream of the header station respectively between the broadcaster's header station and the individual transmission stations of a common-wave network.

While the system clock and the times for the display of an image or output of a sound respectively for the decoding of an image or of a sound are already generated by the video respectively audio source disposed in the studio, which each pack the recorded video respectively audio data into transport data packets or control data of a transport datastream respectively elementary datastream associated with the recorded program, the individual transmission times of the individual transport data packets are only determined in the case of the generation of a transport datastream in the header station connected downstream of the studio.

The system clock is obtained in the video respectively audio source on the basis of accumulated clock pulses of a clock source associated with the video respectively audio source and transmitted as time information in given transport data packets of a transport datastream respectively in given control data of an elementary datastream to the header station. In the header station, the time information containing the system clock is packed into transport data packets of the transport datastream. Additionally, in the header station, the transmission times of the individual transport data packets are obtained on the basis of accumulated clock pulses of a clock source associated with the header station and also stored as time information in given transport data packets of the transport datastream.

The precision of the system clock stored in this manner in the time-information fields of the individual transport datastreams respectively elementary datastreams and of the individual stored transmission times is quite substantially dependent upon the accuracy of the clock sources used in each case. While the clock source of a video respectively audio source typically provides a good average clock accuracy, the clock source used in a process computer of the header station is unfortunately characterized by only a low clock precision in the short-time horizon. The clock precision of the clock source used in the header station in the long-time horizon is comparatively good because of a time synchronization of the clock source used in the header station with a reference clock source with a good clock precision, for example, with the reference clock of the Global-Positioning-System (GPS) or of the Network-Time-Protocol (NTP) server within a relatively large time raster.

From DE 10 2009 057 362 A1, a method for generating a transport datastream in a television transmission system is known, in which the clock source used in the studio provides a significantly poorer clock precision by comparison with the clock source used in the header station. In this context, the clock precision of the clock source associated with a header station, which typically provides a high clock precision only in the long-time horizon, is improved in its clock precision in the short-time horizon by means of interpolation of the clock of an NTP-server responsible for the long-time horizon. In spite of the interpolation, the clock source of the header station provides an undesired phase jitter, which leaves the clock precision of the clock source associated with the header station with a quality also unsatisfactory for the demands of contemporary television transmission systems in the short-time horizon.

SUMMARY OF THE INVENTION

Embodiments of a method and a device advantageously provide for the generation and transmission of time information—especially of the system clock used and of the exact transmission times of the individual transport data packets of the transport datastream, which are characterized by a high clock precision respectively time precision.

According to embodiments of the invention, the time— especially the transmission time of the individual transport data packet—and the clock—especially the system clock— is not determined on the basis of the comparatively inaccurate clock of the clock source integrated in the header station, but calculated in the header station and transmitted as time information in a transport data packet to each receiver—in the case of the transmission time of a transport data packet, to the output adapter or to the individual transmission stations, or, in the case of the system clock, to the television receiver. In this context, the time information stored in a transport data packet is obtained from the pulse number of a clock accumulated up to the transmission time. The calculation is implemented iteratively by calculating the time information stored in a transport data packet from the time information stored in a last transmitted transport data packet with the addition of the pulse number of the clock accumulated between the transmission time of the two transport data packets, which is obtained, in turn, by multiplying the transmission time between the two transport data packets by the clock.

The transmission time between the two transport data packets is obtained, in turn, from the quotient of the number of data bits transmitted between the two transport data packets in the transmission time and the data rate of the transport datastream.

In a first embodiment of the invention, for the case of a signaling of a system clock following the calculation of the time information stored in each case in the individual transport data packets as pure computational values, the number of data bits transmitted between the transmission times of two respectively successive transport data packets in each case with integrated time information, the data rate of the transport datastream, and the time information of the last transmitted transport data packet with integrated time information are used. As an additional value used in the calculation, the clock, reconstructed in the header station, of the real clock of the clock source contained in a video respectively audio source is used.

In a second embodiment of the invention, for the case of a signaling of a transmission time of a transport data packet, in order to calculate the time information stored in each case in the individual transport data packets, given computational values, namely the number of transmitted data bits in each case between the transmission times of two successive transport data packets, each with integrated time information, the data rate of the transport datastream, the time information of the last transmitted transport data packet with integrated time information, and the nominal value of the system clock are used.

Accordingly, with the signaling according to the embodiments of the invention of a calculated system clock and/or of a calculated transmission time, the clock inaccuracy of the clock source integrated in the header station according to the prior art is removed, and a correct system clock and comparatively correct transmission times are transmitted to the respective receivers.

In the case of the signaling of a system clock, the real clock of the clock source present in a video respectively audio source is preferably transmitted with integrated time information from the video respectively audio source via transport data packets of a transport datastream to the header station. For this purpose, the pulse number accumulated at the transmission time of a data packet with integrated time information of the real clock of the clock source is stored as time information in the currently transmitted data packet.

With the use of an MPEG-coded transport datastream for the transmission of digital pre-compressed video data via an Asynchronous Serial Interface (ASI) interface—asynchronous serial interface—, the pulse number accumulated at the transmission time of the respective transport data packet are preferably stored in the PCR-field of the transport data packet. With use of an un-coded elementary datastream for the transmission of digital uncompressed video data via a Serial-Data-Interface (SDI) interface—serial data interface—, the accumulated pulse number at the transmission time of data of an image is transmitted in control data, especially in the synchronization bit pattern which is respectively are inserted into the elementary datastream at the beginning of the data containing the information of an image. Finally, for the transmission of digital Pulse-Code-Modulation (PCM)-modulated—pulse code modulated—audio data in an elementary datastream via an Audio Engineering Society-3 (AES3)—audio engineering society—, the accumulated pulse number at the transmission time of the audio data associated with an image is transmitted in control data, especially in a synchronization bit pattern, which is respectively are inserted into the elementary datastream at the beginning of the data containing the audio information.

In the header station, the real clock of the clock source used in a video respectively audio source is preferably reconstructed by dividing the difference in each case between the time information from two successive transport data packets respectively control data, each with integrated time information, by the reception times of the associated transport data packets respectively control data, each with integrated time information, determined in an input adapter disposed upstream of the header station. The reception time of a transport data packet respectively of control data in the input adapter is obtained from the accumulated pulse number of a clock source integrated in the input adapter at the time of the reception of the transport data packet respectively of the control data, of which the frequency precision is greater than the frequency precision of the clock source present in the video respectively audio source.

Since the clock reconstructed in the header station of the clock source used in the video respectively audio source leads to a falsification of the time information stored in each case in the individual transport data packets for the signaling of the system clock because of the good average clock precision of this clock source by comparison with the nominal system clock, this reconstructed clock in the header station is preferably limited with regard to its frequency deviation and/or frequency drift to a maximal frequency deviation value and a maximal frequency drift value specified by the transmission standard.

In the case of the signaling of a transmission time for a transport data packet, several transport data packets are preferably combined for reasons of efficiency to form a cluster of transport data packets which provides its own header—data packet header—in which the time information determined for the cluster of transport data packets is stored. In this manner, only a single time information must be transmitted for a number of transport data packets integrated in the cluster, instead of one time information for every individual transport data packet. By preference, a Realtime Transport Protocol (RTP) data packet—real-time transport protocol data packet—is used for the cluster of transport data packets which comprises a given number of transport data packets. With the use of a cluster of transport data packets instead of individual transport data packets, the data bits transmitted in each case between two successively transmitted clusters, in each case with integrated time information, are preferably used in the iterative calculation of the time information stored in each cluster of transport data packets.

The transport data packets transmitted from the header station are preferably transmitted via a local packet-orientated network preferably via a packet-orientated network operating according to the Internet Protocol (IP)—Internet protocol—to an output adapter disposed downstream of the header station. In the output adapter, the individual transport data packets respectively clusters of transport data packets, preferably RTP-transport data packets, are buffered in a buffer until the transmission time of the respective transport data packet. In this manner, different transmission delays of the individual transport data packets respectively of the individual clusters of transport data packets are picked up in the local packet-orientated network on the basis of a different intensity of transmission volume in the network.

The transport data packets transmitted from the header station are alternatively transmitted directly to the individual transmission stations installed in a common-wave network via a local packet-orientated network, preferably via a packet-orientated network operating according to the Internet protocol. In an equivalent manner, the received transport data packets respectively clusters of transport data packets, preferably RTP-transport data packets, are preferably buffered in the buffer until the transmission time of the respective transport data packet.

The time interval of the transmission times of two transport data packets to be transmitted successively in the case of the transmission of clusters of transport packets between the header station and the output adapter respectively the individual transmission stations is preferably calculated in the output adapter respectively in individual transmission stations from the integer quotient between the difference of the time information transmitted in each case in two successively transmitted clusters of transport data packets and the number of transport data packets contained in a cluster. In order additionally to increase the accuracy of the time interval determined between the transmission times of two transport data packets to be transmitted successively in the case of the transmission of clusters of transport data packets, a correction value stored in a table, which depends upon the position of the transport data packet to be transmitted in each case within the cluster of transport data packets and upon the fractional proportion of the quotient, is added to the determined time interval.

A transport data packet is preferably transmitted in the output adapter or in the transmission station as soon as the accumulated pulse number of a clock of a clock source integrated in the output adapter or in the transmission station has reached the corrected number of clock pulses since the transmission time of the last transmitted transport data packet, which occur within the time interval between the transmission times of two transport data packets to be transmitted successively.

The clock source in the output adapter respectively in a transmission station provides a comparatively high clock precision by comparison with the system clock in the short-time horizon, while its clock precision by comparison with the system clock in the long-time horizon is comparatively unsatisfactory. In order to increase the clock precision of the clock source in the output adapter respectively in a transmission station in the long-time horizon, the frequency of a voltage-controlled frequency oscillator integrated in the clock source is preferably controlled within a control loop. Within this control loop, the time difference between the transport data packet buffered longest in the buffer and the transport data packet buffered shortest in the buffer, scaled with the nominal system clock, is used as the control value, which with compared with regard to a set-value deviation with the time difference between the transport data packet buffered longest in the buffer and the transport data packet buffered shortest in the intermediate store acting as a buffer at an initialization time, scaled with the nominal system clock.

Accordingly, there is no pure filled-level control, in which the number of transport data packets in the buffer is controlled to a constant value, but a control of the difference of transmission times between the transport data packets buffered longest and shortest in the buffer to a constant value, scaled with the nominal system clock. If an accelerated respectively delayed transmission of the individual transport data packets in the long-time horizon occurs because of a relatively long-term frequency drift of the clock source integrated in the output adapter or in a transmission station, this is noticeable through a lower respectively higher number of transport data packets buffered in the buffer and through a reduction respectively increase in the difference of transmission times between the transport data packets buffered longest and shortest in the intermediate buffer. This reduction respectively increase in the set-value deviation reduces respectively increases the frequency of the frequency oscillator integrated in the clock source. This guarantees that the difference of transmission times between the transport data packet buffered longest and shortest in the intermediate buffer is controlled to the constant difference value predominating at the initialization time, and accordingly the periodicity between the individual transmission times in the long-time horizon retains a constant value.

The buffer filled level and accordingly the difference of transmission times scaled with the nominal system clock between the transport data packets buffered longest and shortest in the intermediate buffer is not constant because of the transmission jitter in the network between header station and output adapter respectively transmission station and because of the abrupt increase of the buffer filled level in the case of the reception of a cluster of transport data packets. In order to obtain a usable measured value for the difference of transmission times scaled with the nominal system clock between the transport data packets buffered longest and shortest in the intermediate buffer, this value is preferably determined in each case at the individual reception times of a cluster of transport data packets, and the respectively maximal value of all values determined over a given time interval is pursued as the most reliable value.

With the transmission of clusters of transport data packets, the intermediate buffer preferably comprises a first sub-buffer for the storage of received clusters of transport data packets and a second sub-buffer coupled with the first sub-buffer in which the transport data packets unpacked from the cluster which are transmitted at the next transmission times are stored.

For the smoothing of abrupt set-value deviations at the transitions of the individual time intervals, a pre-filter is preferably present in the control loop upstream of the controller, and for the smoothing of high-frequency components in the set-value deviation. For example, an averaging filter is provided upstream of the controller in the case of superposed noise. The controller preferably provides a proportional control behavior, in order not to impair the dynamic of the control loop unnecessarily, and at the same time, to realize a control difference of zero in the presence of integrating behavior of the control path—filled-level path.

The existing clock inaccuracy of the clock of the clock source used in the output adapter or in a transmission station by comparison with the nominal system clock is preferably limited by a level limiter connected downstream of the controller to a maximum frequency deviation specified by the respective transmission standard. An existing frequency drift of the clock of the clock source used in the output adapter or in a transmission station by comparison with the nominal system clock is additionally limited in the control loop by an edge limiter connected downstream of the controller to a specified maximal frequency drift specified by the respective transmission standard.

BRIEF DESCRIPTION OF THE DRAWINGS

Exemplary embodiments of the method according to the invention and the device according to the invention for signaling a transmission time and/or a system clock in a digital television transmission system are explained in detail in the following with reference to the drawings. The Figures of the drawings show.

DETAILED DESCRIPTION OF EXEMPLARY EMBODIMENTS OF THE INVENTION

Figure 10:
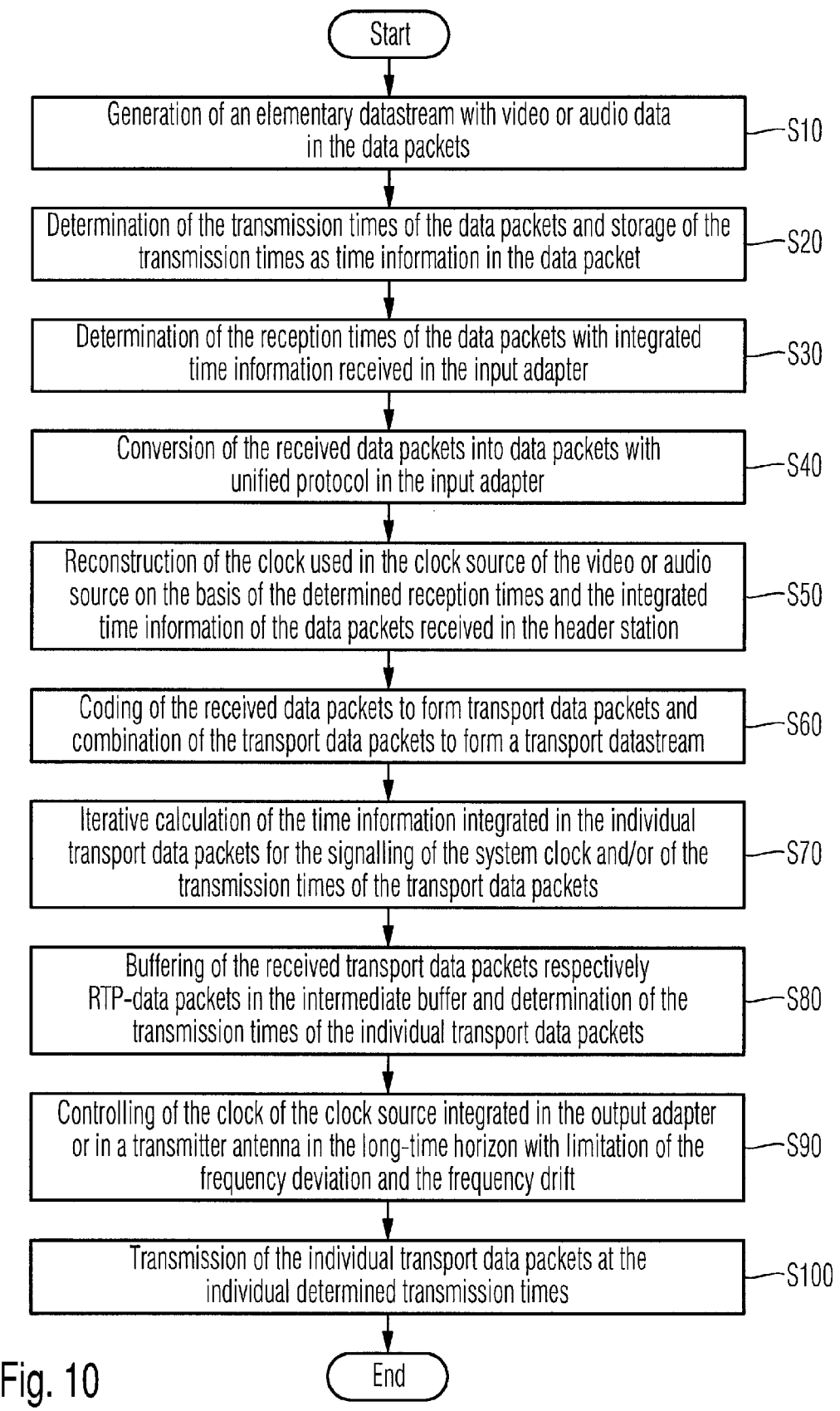

In the following, the embodiments of the method according to the invention for the signaling of a transmission time and/or a system clock in a digital television transmission system is explained with reference to the flow diagram in FIG. 10 in combination with the components of the device for the signaling of a transmission time and or a system clock in a digital television transmission system illustrated in FIGS. 1 to 5.

Figure 1:
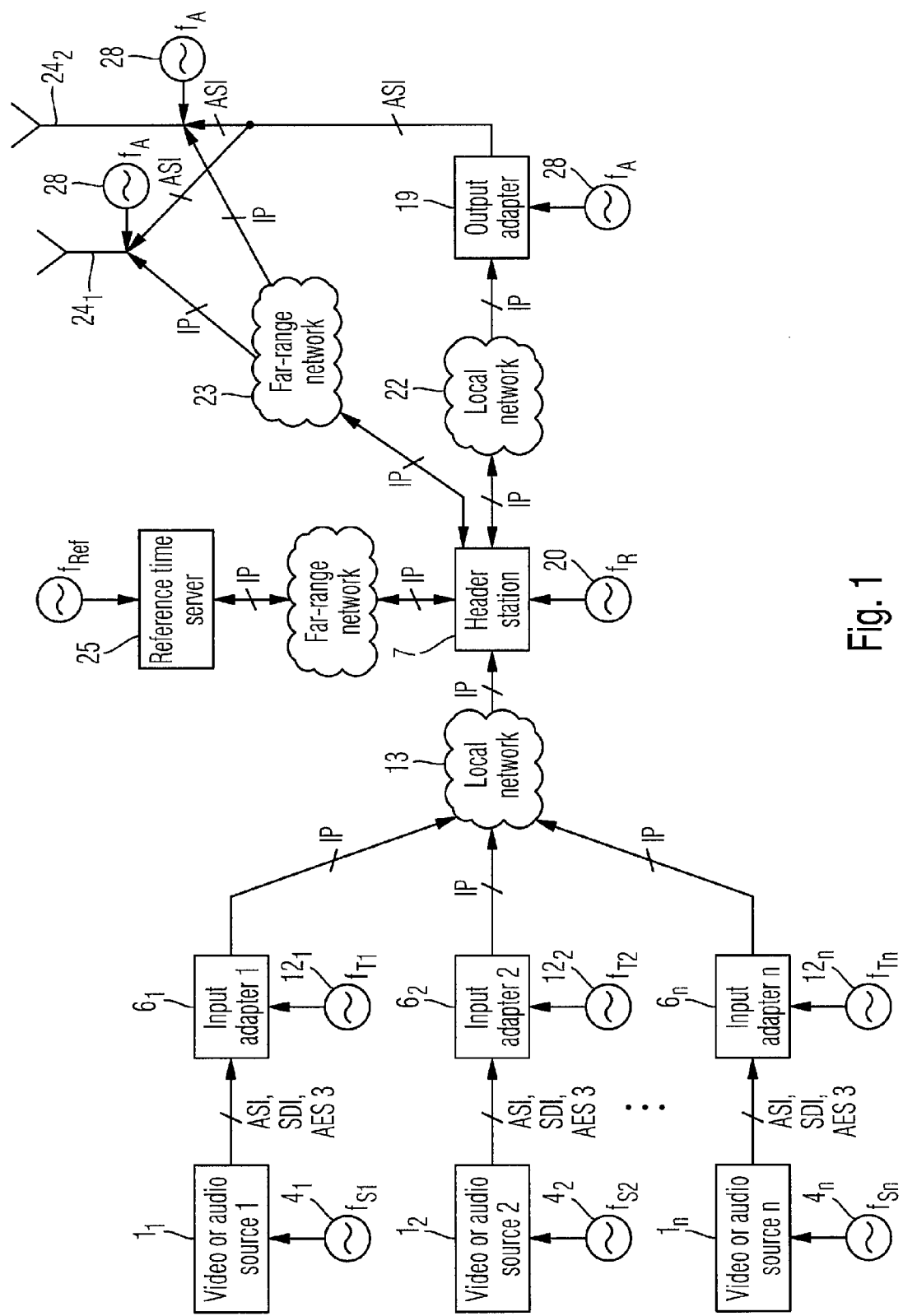
FIG. 1 a block diagram of an exemplary embodiment of the transmitter end of a digital television transmission system.
Figure 2:
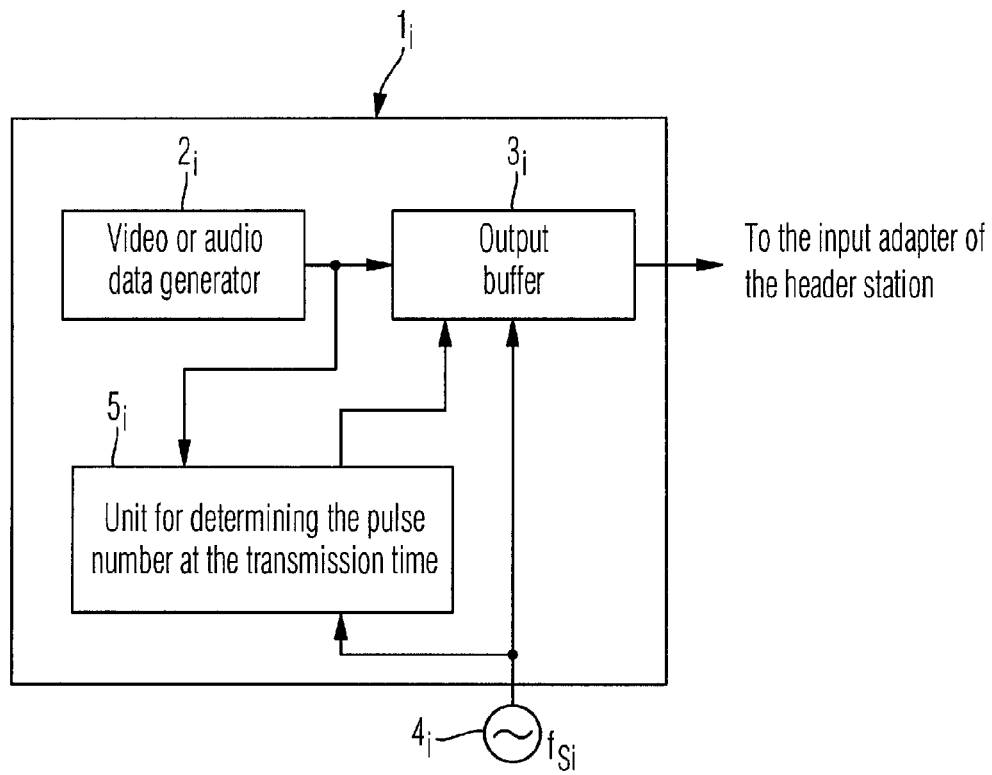
FIG. 2 a block diagram of an exemplary embodiment of the video or audio source.
Figure 3:
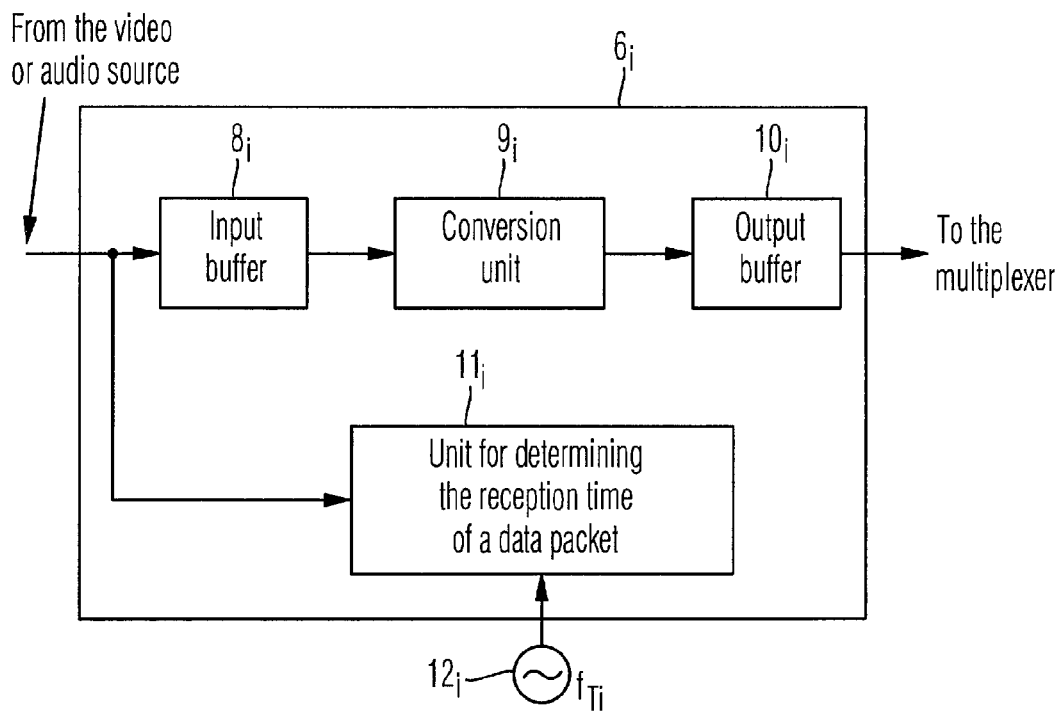
FIG. 3 a block diagram of an exemplary embodiment of the input adapter.

In the first method step S10 of the embodiments of the method according to the invention, as shown in FIG. 1, a transport datastream with transport data packets or an elementary datastream with digital data, which, in each case, contain video data or audio data, are generated in each case in the individual video or audio sources $1_1, 1_2, \ldots, 1_i, \ldots, 1_n$. For this purpose, the individual video or audio source $1_i$ according to FIG. 2 contains a video or audio data generator $2_i$, for example, a TV camera, for the generation of digital video data or an audio recording system for the generation of digital audio data. A video or audio data generator $2_i$ generates a pre-compressed digital transport datastream with digital, typically MPEG-coded video transport data packets according to the ASI-protocol standard, an uncompressed digital elementary datastream with digital un-coded video data according to the SDI-protocol standard or a digital elementary datastream with digital PCM-modulated audio data according to the AES3-protocol standard.

The individual transport data packets respectively datastreams with video or audio data are buffered in a downstream output buffer $3_i$. The individual transport data packets respectively datastreams are read out in the clock $f_{Si}$ of a clock source $4_i$ allocated to the video or audio source $1_i$ from the output buffer $3_i$ and transmitted in this clock $f_{Si}$ to an input adapter $6_i$ disposed upstream of the header station 7. The clock $f_{Si}$ of the respective clock source 4 in this context is dependent upon the protocol standard used in each case and can also vary within a protocol standard used. The clock precision of the clock $f_{S1}, f_{S2}, \ldots, f_{Si}, \ldots f_{Sn}$ of the clock source $4_1, 4_2, \ldots, 4_i, \ldots, 4_n$ used in a video or audio source $1_1, 1_2, \ldots, 1_i, \ldots, 1_n$ by comparison with the system clock of an MPEG-coded television transmission at the level of, for example, 27 MHz, typically amounts to, for example, 30 ppm and is therefore disposed within a good average precision range.

The display of the individual image associated with the respective video in the television receiver at the correct time, which relates to the recording time of the respective image in the video or audio source $1_i$, is signaled to the television receiver in the case of a transmission of image data in MPEG-coded transport data packets according to the ASI-standard the recording time of the respective image over the number of clock pulses accumulated until the recording time of the clock source $4_1, 4_2, \ldots, 4_i, \ldots, 4_n$ used in the video or audio source $1_1, 1_2, \ldots, 1_i, \ldots, 1_n$ in the PTS-field in the data packet header (Header) of the transport data packet transmitting the image data of the respective image through the video or audio source $1_i$.

In the case of a transmission of image data in un-coded digital datastreams according to the SDI-standard, the recording time of the respective image is signaled via the number of clock pulses accumulated until the recording time of the clock source $4_1, 4_2, \ldots, 4_i, \ldots, 4_n$ used in the video or audio source $1_1, 1_2, \ldots, 1_i, \ldots, 1_n$ via associated control data, preferably via associated synchronization bit patterns, in the digital datastream before the data which contain the first line of the respective image through the video or audio source $1_i$.

In the case of a transmission of audio data in un-coded digital datastreams according to the AES3-standard, the recording time of the sound associated with the respective image is signaled via the number of clock pulses accumulated until the recording time of the clock source $4_1, 4_2, \ldots, 4_i, \ldots, 4_n$ used in the video or audio source $1_1, 1_2, \ldots, 1_i, \ldots, 1_n$ via associated control data, preferably via associated synchronization bit patterns, in the digital datastream before the audio data through the video or audio source $1_i$.

In an equivalent manner, the time and accordingly the sequence of the decoding of the individual transport data packet, which, in turn, relates to the time and accordingly to the sequence of the coding of the respective transport data packet in the video or audio source $1_i$, is signaled via a time information in the DTS-field of the respective transport data packet through the video or audio source $1_i$.

Since the time information stored in each case in the PTS- and DTS-field of the respective transport data packet are obtained as a pulse number of the clock of the clock source $4_i$ integrated in the respective video or audio source $1_i$, the clock of the respective clock source $4_i$ is signaled to the television receiver via time information, which, in turn, are obtained as a pulse number of the clock of the clock source $4_i$ in the PCR-fields of respectively successive transport data packets. In the case of un-coded video data, the time information required for the reconstruction of the clock in the television receiver are stored in an appropriate field directly before the first video data of an image in the elementary datastream. In an equivalent manner, in the case of the transmission of PCM-modulated audio data, the time information required for the reconstruction of the clock in the television receiver is placed in an appropriate field directly before the audio data in the elementary datastream.

In the next method step S20, for the signaling of the clock of the clock source $4_i$ integrated in a video or audio source $1_i$ to a television receiver, the pulses of the clock of the clock source $4_i$ are supplied to a unit $5_i$ for determining the pulse number at the transmission time of the transport data packet respectively the control data and counted there. From the information regarding which transport data packet buffered in the output buffer $3_i$ respectively which control data buffered in the output buffer $3_i$ is respectively are transmitted at which clock pulse of the clock source $4_i$, the pulse number of the clock of the clock source $4_i$ counted in each case at the transmission time of the transport data packet to be transmitted, respectively of the control data to be transmitted, is stored as time information in each transport data packet respectively in each control data by the unit $5_i$ for determining the pulse number at the transmission time.

The individual transport datastreams respectively elementary datastreams are transmitted from the individual video or audio sources $1_1, 1_2, \ldots, 1_i, \ldots, 1_n$ in each case to allocated input adapters $6_1, 6_2, \ldots, 6_i, \ldots, 6_n$, which are disposed in each case upstream of a header station 7. In each input adapter $6_i$ according to FIG. 3, the individual transport data packets of each transport datastream respectively the data of each elementary datastream are buffered in an associated input buffer $8_i$, before they are converted in a downstream conversion unit $9_i$ from the transmission protocol used in each case—ASI, SDI, AES3 etc.—into a unified transmission protocol of a packet-orientated network, preferably into an Internet Protocol (IP)—Internet Protocol—and then placed into an associated output buffer $10_i$.

In the next method step S30, the reception times of those transport data packets respectively control data which contain a time information in each case are determined in each input adapter $6_i$ in a unit $11_i$ for determining the reception time of a data packet. For this purpose, in turn, the pulse number of a clock of a clock source $12_1, 12_2, \ldots, 12_i, \ldots, 12_n$ associated with the respective input adapter $6_1, 6_2, \ldots, 6_i, \ldots, 6_n$ accumulated at the reception time of each transport data packet respectively of the control data is determined. The clock precision of the clock $f_{T1}, f_{T2}, \ldots, f_{Ti}, \ldots, f_{Tn}$ of such a clock source $12_1, 12_2, \ldots, 12_i, \ldots, 12_n$ by comparison with the system clock of an MPEG-coded television transmission is comparatively high at approximately +/−1 ppm. The determined reception times of the individual transport data packets respectively control data with integrated time information are stored by the unit $11_i$ for determining the reception time of a data packet in un-used fields of the associated IP-based data packets for transmission to the header station 7.

Figure 4:
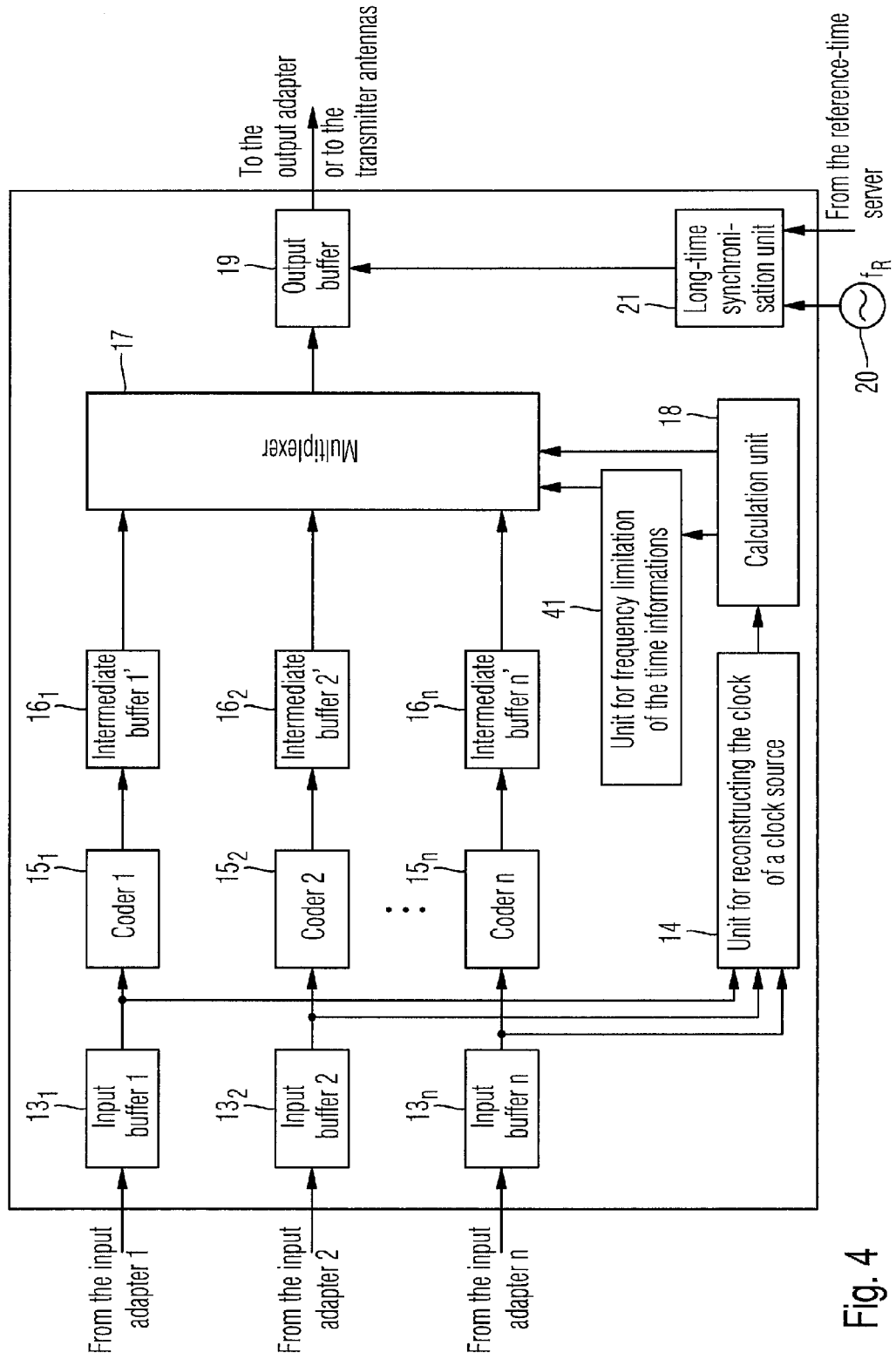
FIG. 4 a block diagram of an exemplary embodiment of the header station.

The data packets of the individual transport datastreams according to the ASI-standard respectively the individual data of the elementary datastreams according to the SDI-respectively AES3-standard are packed in individual data packets of a data-packet stream for transfer via a packet-orientated local network 13 and transmitted from the output buffers $10_1, 10_2, \ldots, 10_i, \ldots, 10_n$ of the individual input adapters $6_1, 6_2, \ldots, 6_i, \ldots, 6_n$ via the packet-orientated local network 13, especially via the Internet, to the header station 7 according to FIG. 4 and stored there in the associated input buffers $13_1, 13_2, \ldots, 13_i, \ldots, 13_n$.

In the next method step S40, the real clocks $f_{PCR}$ associated in each case with the clock sources $4_1, 4_2, \ldots, 4_i, \ldots, 4_n$ of the individual video or audio sources $1_1, 1_2, \ldots, 1_i, \ldots, 1_n$ are reconstructed in a unit 14 associated with the header station 7 for the reconstruction of the clock of a clock source on the basis of time information $PCR_{N+1}$ and $PCR_N$ integrated in each case in successive data packets N and N+1 of the individual data-packet streams and the transmitted reception times $t_{E_{N+1}}$ and $t_{E_N}$ according to equation (1).

$$f_{PCR} = \frac{PCR_{N+1} - PCR_N}{t_{E_{N+1}} - t_{E_N}} \qquad (1)$$

The data packets of the individual data-packet streams buffered in the individual input buffers $13_1, 13_2, \ldots, 13_i, \ldots, 13_n$ are coded in the next method step S50 in downstream coders $15_1, 15_2, \ldots, 15_i, \ldots, 15_n$, in each case to form MPEG-compatible transport data packets and buffered in associated buffers $16_1, 16_2, \ldots, 16_i, \ldots, 16_n$. In the same method step S50, the individual transport data packets of the individual elementary transport datastreams are combined in a multiplexer 17 into a common transport datastream.

In a calculation unit 18 associated with the header station 7, starting from the clock $f_{PCR}$ of a clock source determined in the preceding unit 14 for the reconstruction of the clock of a clock source, in order to signal the clock of the clock sources $4_1, 4_2, \ldots, 4_i, \ldots, 4_n$ integrated in the individual video or audio sources $1_1, 1_2, \ldots, 1_i, \ldots, 1_n$ to the television receivers, the time information required for a reconstruction of the clock in the television receiver is determined in each case iteratively in successive transport data packets with integrated time information, according to equation (2).

$$PCR_{N+1} = PCR_N + \frac{N_{Bits}(T_{N+1}) - N_{Bits}(T_N)}{f_{TS}} \cdot f_{PCR} \qquad (2)$$

For this purpose, according to equation (2), the time information $PCR_{N+1}$ in a transport data packet N+1 is obtained iteratively from the time information $PCR_N$ of the last transmitted transport data packet N through addition of the quotient multiplied by the reconstructed clock $f_{PCR}$ between the number of data bits $N_{Bits}(T_{N+1})-N_{Bits}(T_N)$, which are transmitted in each case between the successively transmitted transport data packets N+1 and N, and the data rate $f_{TS}$ of the transport datastream.

In a unit 41 adjoining the calculation unit 18 for the frequency limiting of the time information, the time information which are responsible for the signaling of the clock of the clock sources $4_1, 4_2, \ldots, 4_i, \ldots, 4_n$ associated in each case with the individual video or audio source $1_1, 1_2, \ldots, 1_i, \ldots, 1_n$, are matched in each case in successive transport data packets N and N+1 with regard to a limitation of the frequency deviation and the frequency drift of the reconstructed clock $f_{PCR}$. This guarantees that a frequency deviation respectively frequency drift of the clock of these clock sources $4_1, 4_2, \ldots, 4_i, \ldots, 4_n$ resulting from a measurement error in the registration of the reception times of the individual transport data packets respectively control data with integrated time information remains within a given limit and accordingly, the individual time information (PCR, PTS, DTS) can be reconstructed correctly in the television receiver within a limited precision.

In the same calculation unit 18, for the signaling of the transmission times of the individual transport data packets to an output adapter 19 disposed downstream of the header station 7 or to the individual transmission stations 24$_1$, 24$_2$, . . . of a common-wave network, the time information transmitting the transmission times in each case are determined iteratively in each case from two successive transport data packets with integrated time information.

In order not to transmit an associated transmission time in each case for every individual transport data packet, which would significantly impair the efficiency of the transmission, a time information containing a transmission time is determined and transmitted in each case only for a given number of transport data packets. From these transmitted time information, the transmission time of every individual transport data packet is reconstructed in the output adapter or in the transmission stations of the common-wave network.

In a first variant, a transmission time is transmitted in each case only for every N-th transport data packet, from which the transmission times of the remaining N−1 transport data packets are determined. The time information $T_{N+1}$ in the N+1-th transport data packet containing the transmission time of the N+1-th transport data packet can be determined according to equation (3A) from the time information $T_1$ in the first transport data packet containing the transmission time of the first transport data packet through addition of the quotient of the number of transmitted data bits $N_{Bits}(T_{N+1})-N_{Bits}(T_1)$ between the first and the N+1-th transport data packet multiplied by the nominal system clock $f_{Sys}$ of an MPEG-coded television transmission (27 MHz) and the N+1-th transport data packet and the data rate $f_{TS}$ of the transport datastream.

$$T_{N+1} = T_1 + \frac{N_{Bits}(T_{N+1}) - N_{Bits}(T_1)}{f_{TS}} \cdot f_{Sys} \quad (3A)$$

In a second variant, which will be considered in greater detail in the following, n transport data packets are combined in each case to form a cluster of transport data packets, and the transmission time of the cluster of transport data packets is stored in the header—data packet header—of the cluster of transport data packets. By preference, the so-called Real-time Transport Protocol (RTP)—real-time transport protocol—is used as the cluster of transport data packets, which combines, and provides with a corresponding RTP-data packet header, several transport data packets on the application layer—application layer—to form a cluster of transport data packets.

For the iterative calculation of a time information $RTP_{N+1}$ stored in an RTP-transport data packet N+1, according to equation (3B), the quotient of the number $N_{Bits}(T_{N+1})-N_{Bits}(T_N)$ of data bits transmitted between the RTP-transport data packet N and the RTP-transport data packet N+1 multiplied by the nominal system clock $f_{Sys}$ of an MPEG-coded television transmission and the data rate $f_{TS}$ of the transport datastream is added to the time information $RTP_N$ of a last constructed and transmitted RTP-transport data packet N.

$$RTP_{N+1} = RTP_N + \frac{N_{Bits}(T_{N+1}) - N_{Bits}(T_N)}{f_{TS}} \cdot f_{Sys} \quad (3B)$$

The second variant of the invention is preferable to the first variant of the invention, because the transmission of the time information relevant for the system clock in the header of the individual transport data packets is separated from the transmission of the time information relevant for the transmission times in the header of an RTP-transport data packet preferably selected as the cluster of transport data packets, and accordingly the allocation of the individual time information is unambiguously specified and no additional allocation information reducing the efficiency of the transmission needs to be transmitted.

The individual time information is provided by the calculation unit 18—in the case of the time information containing a system clock, after interconnection of the unit 41 for frequency limitation of the time information—to the multiplexer 17 and, in the same method step S70, inserted into the corresponding fields of the header of the individual transport data packets respectively RTP-transport data packets. The individual transport data packets accordingly generated for the transmission of the common transport datastream are buffered in an output buffer 19 connected downstream of the multiplexer 17 until transmission.

The individual transport data packets of the common transport datastream are transmitted with a given data rate. The timing of the common transport datastream is implemented via the clock $f_R$ of a clock source 20 allocated to the header station 7. This clock source provides a comparatively poor clock precision by comparison with the nominal system clock of the digital television transmission in the short-time horizon (typically +/−100 ppm). In a long-time synchronization unit 21, this comparatively inaccurate clock of the clock source 20 in the short-time horizon is synchronized with the long-time stable clock of a reference-time server 25, for example, of a Network-Time-Protocol (NTP)-server—network time protocol server—in the long-time horizon. The individual data bits of the individual transport data packets of the common transport datastream are transmitted with the output clock of the long-time synchronization unit 21 via a local packet-orientated data network 22, preferably via the Internet, to the output adapter 19 or via a packet-orientated wide range network 23, which is also preferably an IP-based network, to the individual transmission stations 24$_1$, 24$_2$, . . . of a common-wave network (so-called transport stream over IP-based network (Transport-Stream-over-Internet-Protocol (TSoverIP))).

In the next method step S80, the transport data packets received in the output adapter 19 respectively in the individual transmission stations 24$_1$, 24$_2$, . . . are stored in an intermediate buffer 26. In the first sub-variant of the invention, this intermediate buffer 26 is a single buffer, while in the second variant of the invention, the intermediate buffer 26 comprises a first sub-buffer 26$_1$, in which the individual received and not yet unpacked clusters of transport data packets, that is, preferably the individual not yet unpacked RTP-transport data packets, are stored, and a second sub-buffer 26$_2$, in which the unpacked transport data packets are stored.

A transmission of an RTP-transport data packet from the first sub-buffer 26$_1$ to the second sub-buffer 26$_2$ is implemented on demand by the second sub-buffer 26$_2$, as soon as no more individual transport data packets are contained in the second buffer 26$_2$.

In the same processing step S80, the transmission times of the individual transport data packets are determined in a unit 27 for determining the transmission time of a transport data packet.

In the case of the first variant of the invention, in order to determine the transmission time of a transport data packet, the unit 27 reads out the time information $T_1$ and $T_{N+1}$ from two transport data packets with an interval of N transport data packets in each case with integrated time information and, according to equation (4A), determines the pulse number ΔT occurring in the time difference between the two time information $T_1$ and $T_{N+1}$.

$$\Delta T = T_{N+1} - T_1 \quad (4A)$$

In the case of the second variant, in order to determine the transmission time of the transport data packet, the unit 27 reads out the time information $RTP_N$ and $RTP_{N+1}$ transmitted in each case in two successively transmitted clusters of transport data packets N and N+1 in each case, and, according to equation (4B), determines the pulse number ΔRTP occurring within the time difference between the two time information $RTP_N$ and $RTP_{N+1}$.

$$\Delta RTP = RTP_{N+1} - RTP_N \quad (4B)$$

After a division of the pulse number ΔT according to equation (4A), respectively of the pulse number ΔRTP according to equation (4B), by the number Number_TS_Packets and a subsequent determination of the integer component int(.), the pulse number $\Delta_{TS\text{-}Packet}$ Packet occurring in the transmission time between two transport data packets to be transmitted successively is obtained according to equation (5).

$$\Delta_{TS\text{-}Packet} = \text{int}\left(\frac{\Delta RTP}{\text{Number\_TS\_Packets}}\right) \text{ respectively} \quad (5)$$

$$= \text{int}\left(\frac{\Delta T}{\text{Number\_TS\_Packets}}\right)$$

On the one hand, the determination of the integer component facilitates transmitting the individual transport data packet to a given integer clock number, but, on the other hand, leads to an inaccuracy of the transmission time of the individual transport data packets by comparison with the respective, precise transmission time in the case of the nominal system clock pulse of the MPEG-coded television transmission. In the case of an integration of a time information only in every seventh transport data packet respectively in the case of an integration of seven transport data packets in one RTP-data packet, in each case, an error delay of up to 6 system clocks can result for the transmission time of an individual transport data packet, that is, a delay of a no-longer-tolerable 222 ns with a system clock of 27 MHz.

Figures 6, 7, 8:
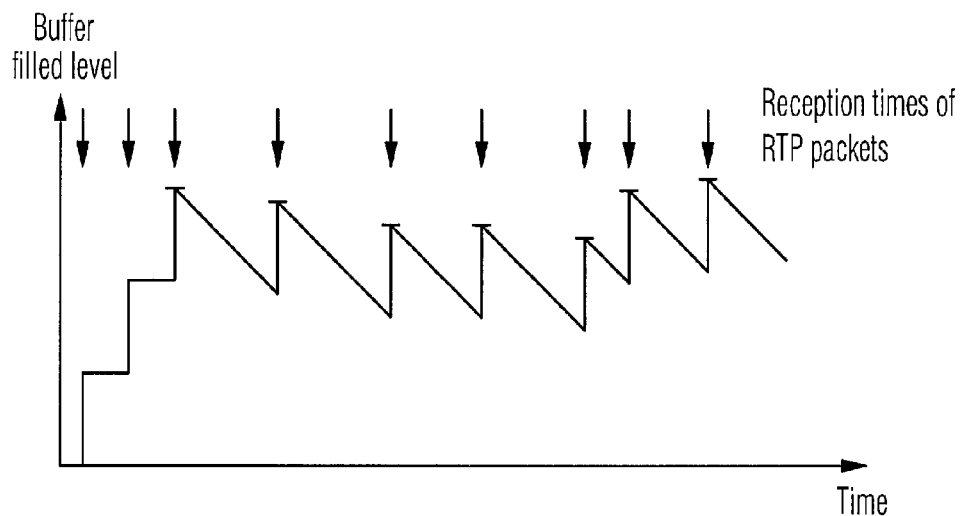
FIG. 6 a table with correction values dependent upon the position of the transport data packet in the cluster and the fractional component.
FIG. 7 a table with number of received RTP-packets, RTP-packet interval and RTP-packet number in the buffer dependent upon the data rate FIG. 8 a time diagram of the buffer filled-level in the buffer.

In order to minimize this intolerable delay, a correction value is added to the determined transmission time in each case dependent upon the position of a transport data packet between two transport data packets, in each case with integrated time information in the case of the first variant of the invention, respectively the position of a transport data packet in the cluster of transport data packets in the case of the second variant of the invention, and dependent upon the fractional proportion of the division between the pulse number ΔRTP respectively ΔT and the number Number_TS_Packets in a cluster of transport data packets according to the table illustrated in FIG. 6, for every individual transport data packet. In this context, a transmission of a time information in every seventh transport data packet respectively a transmission of seven transport data packets in one cluster is assumed. Accordingly, the delay in the transmission time of a transport data packet is minimized to a maximum of a single system clock.

The calculation of the pulse number ΔRTP between the time information $RTP_N$ and $RTP_{N+1}$ transmitted in each case in two successive RTP-data packets N and N+1, and representing a pulse number, and the pulse number $\Delta_{TS\text{-}Packet}$ occurring in the transmission time interval between two transport data packets to be transmitted successively, and the correction by the respective correction value is implemented in the second variant of the invention directly after the transfer of an RTP-data packet from the first sub-buffer $26_1$ to the second sub-buffer $26_2$ in the unit 27 for determining the transmission time of a transport data packet.

The determination of an optimized transmission time for every transport data packet according to the process described above presupposes a constancy of the data rate of the transport datastream during the transmission time between two transport data packets with integrated time information respectively during the transmission time of the cluster of transport data packets. In a third variant of the invention, if the data rate of the transport data packet is not constant, a time information can be transmitted in an RTP-data packet header extension in each case for every transport data packet which is transmitted in an RTP-data packet in order to signal the respective transmission time.

Figure 9A:
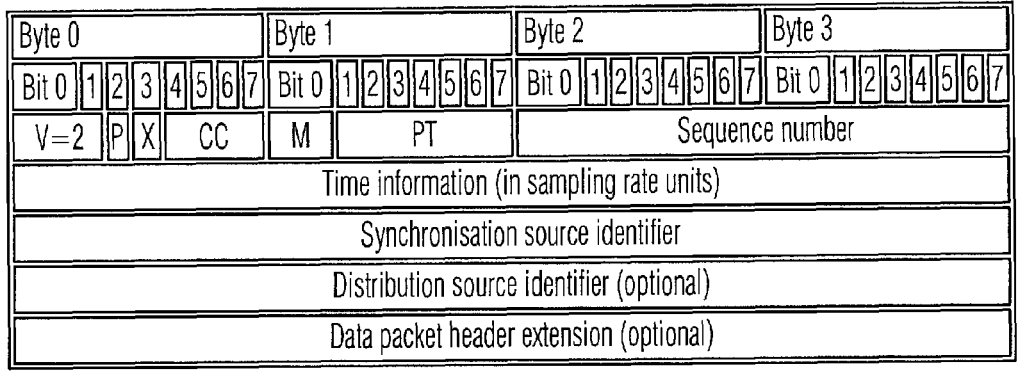
FIGS. 9A, 9B, 9C a data structure of an exemplary embodiment of the one RTP-data packet header, of an RTP-data packet header extension and an RTP-data packet header extension with time information for individual transport data packets and FIG. 10 a flow chart of a method according to the invention for signaling a transmission time and/or a system clock in a digital television transmission system.
Figure 9B:
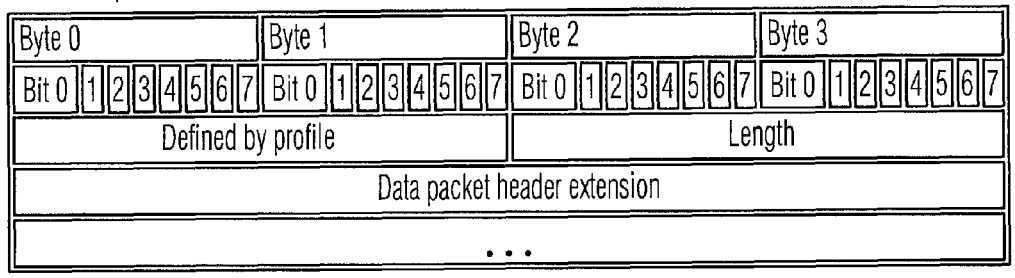
Figure 9C:
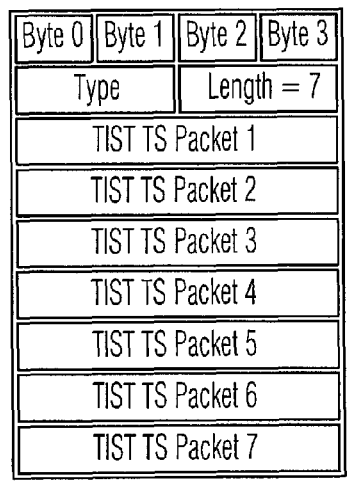

For this purpose, an RTP-data packet header according to FIG. 9A provides an optional field "RTP-data packet header extension", which displays an extension of the RDP data packet header with additional fields. These additional fields of the RTP-data packet header extension according to FIG. 9B are defined with regard to their length in the field "Length" and provide an extension, in each case by 4 bytes, proportional to the content of the field "Length". In FIG. 9C, in the case of a transmission of seven transport data packets in an RTP-data packet, the associated seven transmission times of the RTP-data packet header extension are illustrated in the respective fields.

In this manner, the transmission times of the individual transport data packets transmitted in an RTP-data packet need no longer be calculated on the basis of a single time information transmitted in an RTP-data packet, but are calculated in advance in the calculation unit 18 of the header station 7 and stored in the individual fields of the RTP-data packet header extension. Alternatively, in a fourth variant of the invention, the transmission time of a transport data packet can also be transmitted as time information in every individual transport data packet. Accordingly, in the third and fourth variant of the invention, the data rate of the transport datastream can fluctuate in time within the transmission time of one RTP-data packet without falsifying the transmission time of the individual transport data packets.

The transmitted or determined transmission times of the individual transport data packets each represent pulse numbers of the nominal system clock. The real transmission time of the individual transport data packet is obtained when the transmitted or determined transmission times of the individual transport data packets with the accumulated pulse number of the clock $f_A$ correspond with the clock source 28 allocated in each case to the output adapter 19 or the transmission stations $24_1$, $24_2$, . . . of the common-wave network. The clock $f_A$ of the clock source 28 does, in fact, provides a comparatively high clock precision by comparison with the nominal system clock in the short-time horizon (typically +/−1 ppm), however, the long-time stability of the clock $f_A$ of the clock source 28 is not very high by comparison. Accordingly, an undesired overflow or open circuit occurs in the intermediate buffer 26 after a certain time.

In the next method step S90, in order to avoid an overflow or open circuit of the intermediate buffer 26, the clock source 28 is realized as a voltage-controlled and typically temperature-compensated frequency oscillator 29, of which the frequency is controlled dependent upon the set-value deviation of the time interval acting as the control value between the transport data packets buffered longest and shortest in the intermediate buffer 26, and accordingly the long-time stability of the clock of the clock source 28 is realized.

In this context, in a unit 30 disposed downstream of the intermediate buffer 26 for determining the maximal transmission time interval of the transport data packets in the intermediate buffer, starting from the determination presented above of an optimized transmission time for every transport data packet, the transmission time of the transport data packet disposed longest in the intermediate buffer 26—in the case of the second variant of the invention, this is a transport data packet in the second sub-buffer $26_2$ unpacked from the respective cluster of transport data packets—and the transmission time of the transport data packet disposed shortest in the intermediate buffer 26—in the case of the second variant of the invention, this is a transport data packet contained in the first sub-buffer $26_1$ in the last received cluster of transport data packets and still not yet unpacked, which is placed in the last position in the cluster—is determined.

Figure 5:
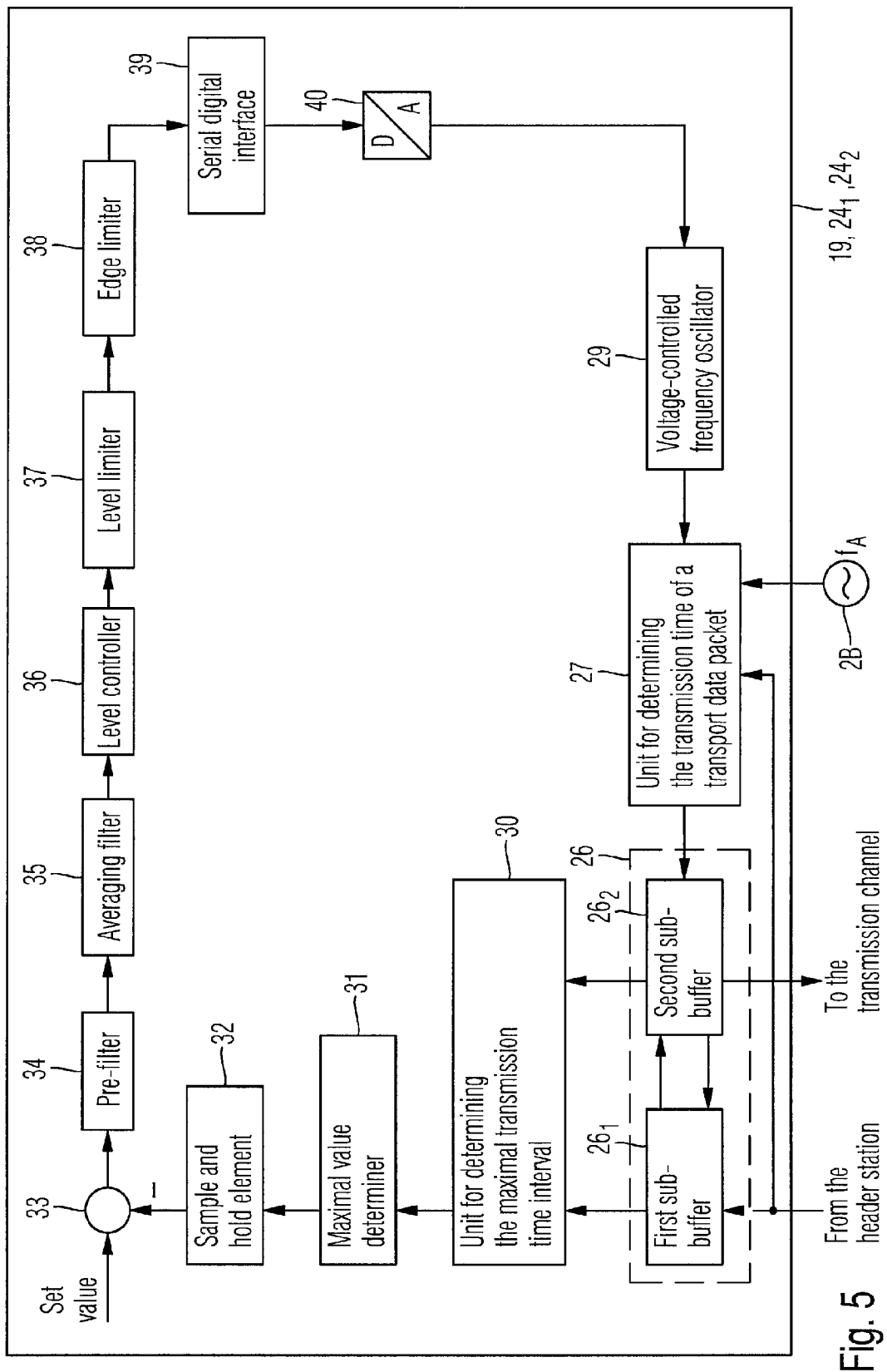
FIG. 5 a block diagram of an exemplary embodiment of the output adapter according to the invention and of a transmission station according to the invention.

Since the transmission time of the individual transport data packet is obtained from the multiplication of the time information transmitted in the transport data packet and the nominal system clock, the latter is independent of the data rate $f_{TS}$ of the transport datastream. With the use of the transmission time interval between the transport data packet buffered longest and shortest in the intermediate buffer 26 as a control value by contrast with the use of the number of data bits buffered in the buffer 26 and/or transport data packets as control value, a time change of the data rate $f_{TS}$ of the transport datastream consequently has no influence on the control result and also need not be known for the frequency control of the voltage-controlled frequency oscillator 29. This is shown in FIG. 5.

In the case of the second variant of the invention, the buffer filled level of the intermediate buffer 26—determined as the number of transport data packets disposed in the intermediate buffer 26—provides a time variable characteristic. It is characterized according to FIG. 8 by an unsteady rise in the individual reception times of a cluster occupied with several transport data packets in the intermediate buffer 26 and by a considerably steadier decline on the basis of the transmission of the individual transport data packets in each case at different transmission times and is accordingly characterized by maxima. Since the transmission time of the individual clusters of transport data packets in the local packet-orientated network 22 fluctuates between the header station 7 and the output adapter 19 respectively in the packet-orientated far-range network 23 between header station 7 and transmission station $24_1$, $24_2$, . . . because of the time-dependent network loading, the individual maxima in the buffer filled level of the intermediate buffer 26, are at different levels, as is evident from FIG. 8. Since, in the case of the second variant of the invention, the clusters of transport data packets with the shortest transmission time lead to a buffer filled level of the intermediate buffer 26 which is most informative, the maximal value of the time interval between the transport data packet buffered shortest and longest in the intermediate buffer, which represents the most reliable control value, is determined in a maximal value determiner 31 disposed downstream of the unit 30 for determining the maximal transmission time interval of the transport data packets in the intermediate buffer over an appropriately specified time.

For the choice of an appropriate time for the maximal value determination, the table presented in FIG. 7 should be used, which shows the number of RTP-data packets received in the intermediate buffer 26 per second, the time interval between two received RTP-data packets and the number of RTP-data packets disposed in the intermediate buffer 26, with a transmission of seven transport data packets in one RTP-data packet and with a buffer depth of 100 ms for the intermediate buffer 26, in each case for different data rates for an MPEG-coded transport datastream. In order to achieve a sufficient number of received RTP-data packets and accordingly a sufficient number of maxima in the time for the maximal-value determination with given parameters, a time for the maximal-value determination of preferably 100 ms is recommended.

This determined maximal value is held in a downstream sample-hold element 32, also used only in the second variant of the invention, over the time of the maximal-value determination and subtracted in a subsequent subtracter 33 from a set value in order to determine a set-value deviation. The maximal time interval between the transport data packet buffered longest and shortest in the buffer at the initialization time is determined and subsequently used as the set value.

In a pre-filter 34 adjoining the subtracter 33, abrupt changes in the set-value deviation, especially instabilities in the set-value deviation at the individual transitions of the maximal-value determination periods, are smoothed. An averaging filter 35 adjoining the pre-filter 34 implements, with its lowpass characteristic, a smoothing of higher frequency components in the set-value deviation, especially a smoothing of superposed noise components in the set-value deviation. The averaging filter 35 iteratively determines an averaged set-value deviation $\bar{y}_{i+1}$ at the sampling time i+1 from the averaged set-value deviation $\bar{y}_i$ at the sampling time i and the un-averaged set-value deviation $y_i$ at the sampling time i via a sliding, exponential averaging with the weighting factor α according to equation (6). The weighting factor α is preferably specified in powers of two, so that the averaging filter 35 can be realized efficiently with regard to calculation time only through shift operations and with the assistance of fixed-point arithmetic.

$$\bar{y}_{i+1}=(1-\alpha)\cdot\bar{y}_i+\alpha\cdot y_i \qquad (6)$$

The pre-filtered and averaged set-value deviation is supplied to a controller 36, which provides a purely proportional control behavior with an appropriately dimensioned amplification factor $K_P$. In this manner, the controller 36 does not insert any additional delay into the control loop and at the same time, with an integrating control path and an appropriately dimensioned amplification factor $K_P$, guarantees a set-value deviation which is negligibly small after the settling time of the control loop.

A level limiter 37 which limits the frequency deviation of the voltage-controlled frequency oscillator 29 to a maximal frequency deviation conventional according to the transmission standard adjoins the proportional controller 36. In the case of an MPEG-coded ATSC-transport datastream with an SMPTE310M interface, an absolute frequency deviation of less than +/−2.8 ppm is provided, which is set for the parameterization of the level limiter 37 and therefore prevents a medium-term fluctuation, that is, a wandering of the frequency of the voltage-controlled frequency oscillator 29. Additionally, a limitation of the frequency drift of the voltage-controlled frequency oscillator 29 to a maximal frequency drift specified by the transmission standard is implemented in an edge limiter 38 adjoining the level limiter 37. In the case of an MPEG-coded transport datastream with an ASI-interface, the frequency drift is limited to 75 mHz per second. The edge limiter 38 is parameterized to this maximal value of a frequency drift.

Via a serial digital interface 39, the digital adjustment signal limited with regard to the frequency deviation and/or frequency drift and generated by the controller 36 is transmitted serially to the input of a digital-analog converter 39 and, accordingly, a different clock rate between the edge limiter 38 and the digital-analog converter 39 is overcome. In the digital-analog converter 39, the analog value corresponding to the digital output signal of the edge limiter 38 is determined for the control of the voltage-controlled frequency oscillator 29. The resolution of the digital-analog converter 39 should be selected in such a manner that a minimal change of the digital adjustment signal at the output of the edge limiter 38 at the level of the lowest-value data bit leads to a change in the frequency of the voltage-controlled frequency oscillator 29 disposed significantly below the maximal possible frequency drift.

In the corrected state of the control loop, the transmission time interval between the transport data packet buffered longest and shortest in the intermediate buffer 26 corresponds to the set value, that is to say, to the transmission-time interval between the transport data packet stored longest and shortest in the intermediate buffer 26 at the initialization time.

In the final method step S100, the individual transport data packets buffered in the intermediate buffer 26 are transmitted at their respective transmission times.

In the case of the third and fourth variant of the invention, in which, in each case, a transmission time is determined in the header station 7 and transmitted for every transport data packet, the respective real transmission time is present, if, in the unit 27 for determining the transmission time of a transport data packet, the pulse number of the system clock contained in each case in the time information of the transport data packet to be transmitted agrees with the counted pulse number of the clock $f_A$ of the clock source 28 associated with the output adapter 19 or with a transmission station $24_1$, $24_2$, . . . .

In the case of the first or second variant of the invention, in which, in each case, only the transmission time of a transport data packet in a sequence of transport data packets is transmitted as time information from the header station 7 to the output adapter 19 or to the transmission station $24_1$, $24_2$, . . . , while the transmission times of the other transport data packets in the sequence of transport data packets are calculated in the output adapter 19 or in the transmission station $24_1$, $24_2$, . . . , in order to output the transport data packet, its transmission time is already determined in the header station and only corrected by a correction value in the unit 27 for determining the transmission time of a transport data packet, the process at the real transmission time is exactly the same as in the third or fourth variant of the invention.

In the case of the transport data packets of the first and second variant of the invention, for which the transmission time interval $\Delta_{TS-Packet}$ is calculated in each case for the previous transport data packet to be transmitted and corrected by a correction value, in each case in the unit 27 for determining the transmission time of a transport data packet, the transmission time interval $\Delta_{TS-Packet}$ as pulse number of the system clock corrected by the respective correction value is compared with the pulse number of the clock $f_A$ of the clock source 28 associated with the output adapter 19 or with the transmission station $24_1$, $24_2$, . . . counted since the transmission time of the last transmitted transport data packet and, in the case of identity, the output of the respective transport data packet is activated.

The transport data packets output in the output adapter 19 are transmitted via an ASI-interface by means of a standing line operating according to the Synchronous Digital Hierarchy (SDH) multiplex technique to the individual transmission stations $24_1$, $24_2$, . . . of the common-wave network.

The input adapters $6_1$, $6_2$, . . . , $6_i$, . . . , $6_n$ and also the output adapter 19 can also be integrated in the header station 7, wherein the data traffic between the input adapters $6_1$, $6_2$, . . . , $6_i$, . . . , $6_n$ and the process computer of the header station 7 and between the process computer of the header station 7 and the output adapter 19 can be realized in each case via an internal bus system instead of a local network 13 and 22. Such a technical embodiment is also covered by the invention.

The invention is not restricted to the individual embodiments and variants presented. In particular, all combinations of all features claimed in the individual claims, of all features disclosed in the description and of all features illustrated in the Figures of the drawings are also covered by the invention.

The invention claimed is:

1. A method comprising:
generating a transport datastream (a) from video or audio data to at least one receiver of the transport datastream through an iterative calculation of time information of the transport datastream integrated in a transport data packet, wherein the time information is associated with a last transport data packet with integrated time information in the transport datastream; (b) from a transmission time of a plurality of data bits transmitted since a last transmitted transport data packet with integrated time information in the transport datastream; and (c) from a clock; and
signaling a time or the clock through a header station using the time information,
wherein the signaling includes a pulse number of the clock counted up to a transmission time of a respective transport data packet,
wherein the clock that is signaled is a clock reconstructed, in the header station of a clock source of a video or audio source which generates the transport datastream from the transport data packet or an elementary datastream made of serially transmitted data, and
on the basis of time information $PCR_{N+1}$ and $PCR_N$ integrated in each case in successive data packets N and N+1 of the individual data-packet streams and the transmitted reception times $t_{E_{N+1}}$ and $t_{E_N}$ the following equation applies for the signaled clock $f_{PCR}$:

$$f_{PCR} = \frac{PCR_{N+1} - PCR_N}{t_{E_{N+1}} - t_{E_N}}.$$

2. The method of claim 1, wherein the transmission time of the plurality of data bits corresponds to a quotient of a number of the plurality of data bits and a data rate of the transport datastream.

3. The method of claim 1, wherein the time information is associated with an image or sound in a data packet header in control data of the transport datastream or the elementary datastream, and wherein the time information is a counted number of pulses of the clock of the clock source associated with the video or audio source at the recording time of the image or sound.

4. The method of claim 1, wherein the clock of the clock source associated with the video or audio source is reconstructed from integrated time information and determined reception times in each case of two data packets transmitted in succession in the elementary datastream.

5. The method of claim 1, wherein reception times of two successive transport data packets are determined with a clock of a clock source of an input adapter disposed upstream of the header station, and wherein a frequency stability of the clock of the clock source of the input adapter as determined by comparing with a nominal system clock is higher than a frequency stability of the clock of the clock source associated with the video or audio source as determined by comparing with the nominal system clock.

6. The method of claim 1, wherein the transport data packet of the transport datastream is an MPEG-coded transport data packet with an integrated PCR-time information.

7. The method of claim 1, wherein the elementary datastream is an un-coded datastream received in an SDI-interface with digital, uncompressed video data with time information marking a beginning of an image or a coded datastream received in an AES3-interface with digital PCM-coded audio data with time information marking a beginning of audio data of the elementary datastream associated with the image.

8. The method of claim 1, wherein the time that is signaled is a transmission time of a transport data packet of the transport datastream in an output adapter disposed downstream of the header station or in a transmission station which has a clock source that provides a higher time precision in a short-time horizon than the clock source of the header station.

9. The method of claim 1, wherein a nominal system clock is used when the iterative calculation is for time information associated with a transport data packet that is dependent on time information associated with a preceding transport data packet in the transport datastream.

10. The method of claim 1, wherein several transport data packets of the transport datastream are combined to form a cluster, and wherein time information from the several transport data packets is transmitted for the cluster in a data packet header of the cluster.

11. The method of claim 1, wherein the clock reconstructed in the header station is limited with regard to its frequency deviation or frequency drift.

12. The method of claim 10, wherein a number of data bits to be transmitted between two successive clusters is used for the iterative calculation associated with the cluster.

13. The method of claim 10, wherein the cluster is an RTP-data packet in which a given number of transport data packets is contained.

14. The method of claim 13, wherein the time information of the transport data packets contained in the RTP-data packet are transmitted in an extended data packet header of the RTP-data packet.

15. The method of claim 12, wherein transport data packets received in an output adapter or in a transmission station up to respective transmission times are buffered, and wherein a pulse number occurring in a transmission-time interval between two successively transmitted transport data packets is calculated from an integer quotient of a difference of time information integrated in the two successive clusters through a number of transport data packets contained in one of the two successive clusters.

16. The method of claim 15, wherein a correction value dependent upon a fractional proportion of the quotient and a sequence of the respective transport data packet within the cluster is added to the pulse number occurring in the transmission time interval between the two successively transmitted transport data packets.

17. The method of claim 16, wherein a transport data packet in the output adapter or in the transmission station is transmitted as soon as a number of clock pulses generated by a clock source of the output adapter or the transmission station since the transmission time of the last transmitted transport data packet corresponds to a pulse number occurring in the transmission time interval of the two successively transmitted transport data packets.

18. The method of claim 15, wherein a precision of a clock of a clock pulse associated with the output adapter or the transmission station is stabilized in that a frequency of a frequency oscillator integrated in the clock source is controlled dependent upon a set-value deviation of a difference scaled with the nominal system clock between time information of a longest buffered transport data packet and a shortest buffered transport data packet.

19. The method of claim 18, wherein the time information of the longest buffered transport data packet and the shortest buffered transport data packet in the output adapter or in the transmission station are registered at a reception time of the cluster in the output adapter or in the transmission station.

20. The method of claim 18, wherein a maximum value is determined from all differences determined within a given time interval between the time information of the longest buffered transport data packet and the shortest buffered transport data packet in the output adapter or in the transmission station and compared with a difference determined at an initialization time and serving as a set value in order to determine a set-value deviation.

21. The method of claim 20, wherein before a control in a proportional controller, and wherein the set-value deviation is supplied to a pre-filter for a smoothing of abrupt set-value deviations and to an averaging filter for a smoothing of higher-frequency components in the set-value deviation.

22. The method of claim 21, wherein an adjustment signal generated by the proportional controller is supplied to a level limiter to limit a frequency deviation of the clock of the clock source used in the output adapter or in the transmission station from the nominal system clock to a maximum frequency deviation specified by a transmission standard for the transport datastream or to an edge limiter to limit a frequency drift of the clock of the clock source used in the output adapter or in the transmission station to a maximum frequency drift as specified by a transmission standard for the transport datastream.

23. A device for signaling a time or a clock through a header station generating a transport datastream from video or audio data to at least one receiver of the transport datastream comprising:
 a coder configured to generate transport data packets from individual transport data packets respectively transmitted in a transport datastream or an elementary datastream;
 a multiplexer configured to generate a transport datastream from the individual transport data packets;
 a calculation unit configured to perform an iterative calculation of a time information integrated in a transport data packet of the transport datastream dependent upon a time information integrated in a preceding transport data packet in the transport datastream;

wherein the time information signals a time or a clock,
wherein the device further comprises, for a signaling of the clock, a unit for a reconstruction of a clock of a clock source,
wherein the unit is connected upstream of the calculation unit, and
on the basis of time information $PCR_{N+1}$ and $PCR_N$ integrated in each case in successive data packets N and N+1 of the individual data-packet streams and the transmitted reception times $t_{E_{N+1}}$ and $t_{E_N}$ the following equation applies for the signaled clock $f_{PCR}$:

$$f_{PCR} = \frac{PCR_{N+1} - PCR_N}{t_{E_{N+1}} - t_{E_N}}.$$

24. The device according to claim 23, further comprising: for the reconstruction of the clock of the clock source integrated in a video or audio source, an input adapter with an integrated clock source and a unit for a determination of a reception time of the transport data packet of control data are connected upstream of the header station.

25. The device according to claim 24, further comprising: for a determination of time information integrated in the transport data packet in control data, a unit for a determination of a pulse number of a transmission time is connected downstream of the clock source of the video or audio source.

26. The device according to claim 23, further comprising: a unit for a frequency limiting of the time information, wherein the unit is provided in the header station.

27. The device according to claim 23, further comprising: for a time-synchronous transmission of the individual transport data packets at a respective transmission time, a unit configured to determine the respective transmission time of the individual transport data packet and the clock source is provided in an output adapter or in a transmission station.

28. The device according to claim 23, further comprising: a level limiter configured to limit a frequency deviation of the clock of the clock source used in an output adapter or in a transmission station from the nominal system clock to a maximal frequency deviation specified by a transmission standard for transport datastreams; or
an edge limiter configured to limit a frequency drift of the clock of the clock source used in the output adapter or in the transmission station to a maximal frequency drift specified by a transmission standard for transport datastreams,
wherein the level limiter or the edge limiter are connected downstream of the controller.

29. The device according to claim 23, further comprising: an intermediate buffer configured to buffer the individual transport data packets of the transport datastream,
wherein the intermediate buffer is present in an output adapter connected downstream of the header station or in a transmission station connected downstream of the header station.

30. The device according to claim 29, further comprising: a unit configured to determine a maximal transmission-time interval of the individual transport data packets in the intermediate buffer,
wherein the unit is connected downstream of the intermediate buffer.

31. The device according to claim 29, further comprising: in the case of an integration of several transport data packets in a cluster of transport data packets, the intermediate buffer further configured to include a first sub-buffer for buffering of received clusters of transport data packets and a second sub-buffer coupled to the first sub-buffer for buffering of the individual transport data packets.

32. The device according to claim 29, further comprising: for a long-time stabilization of a frequency and a frequency drift of the clock source of the output adapter or of the transmission station, a control loop configured to control the frequency of a frequency oscillator integrated in the clock source dependent upon a set value deviation of a difference between time information of a longest buffered transport data packet and a shortest buffered transport data packet in the intermediate buffer.

33. The device according to claim 32, further comprising: for a determination of a maximal difference between the time information of the longest buffered transport data packet and the shortest buffered transport data packet in the intermediate buffer over a given time interval, a maximal-value determiner configured to determine a maximal transmission-time interval of the individual transport data packets,
wherein the maximal-value determiner is connected downstream of the intermediate buffer.

34. The device according to claim 33, further comprising: for the compensation of the set-value deviation, a controller configured with a proportional control behavior.

35. The device according to claim 33, further comprising: a pre-filter configured to smooth abrupt set-value deviations; or
an averaging filter configured to smooth higher frequency components,
wherein the pre-filter or the averaging filter are connected upstream of the controller.

36. A non-transitory computer readable medium containing program instructions for causing a computer or a digital processor to perform the method of:
generating a transport datastream (a) from video or audio data to at least one receiver of the transport datastream through an iterative calculation of time information of the transport datastream integrated in a transport data packet, wherein the time information is associated with a last transport data packet with integrated time information in the transport datastream; (b) from a transmission time of a plurality of data bits transmitted since a last transmitted transport data packet with integrated time information in the transport datastream; and (c) from a clock; and
signaling a time or the clock through a header station using the time information,
wherein the signaling includes a pulse number of the clock counted up to a transmission time of a respective transport data packet,
wherein the clock that is signaled is a clock reconstructed in the header station of a clock source of a video or audio source which generates the transport datastream from the transport datastream from the transport data packet or an elementary datastream made of serially transmitted data,
on the basis of time information $PCR_{N+1}$ and $PCR_N$ integrated in each case in successive data packets N and N+1 of the individual data-packet streams and the transmitted reception times $t_{E_{N+1}}$ and $t_{E_N}$ the following equation applies for the signaled clock $f_{PCR}$:

$$f_{PCR} = \frac{PCR_{N+1} - PCR_N}{t_{E_{N+1}} - t_{E_N}}.$$

37. The computer program according to claim 36, wherein the transmission time of the plurality of data bits corresponds to a quotient of a number of the plurality of data bits and a data rate of the transport datastream.

* * * * *